(No Model.)
A. ANDRÉN.
DRAWING KNIFE.
No. 543,144.  Patented July 23, 1895.
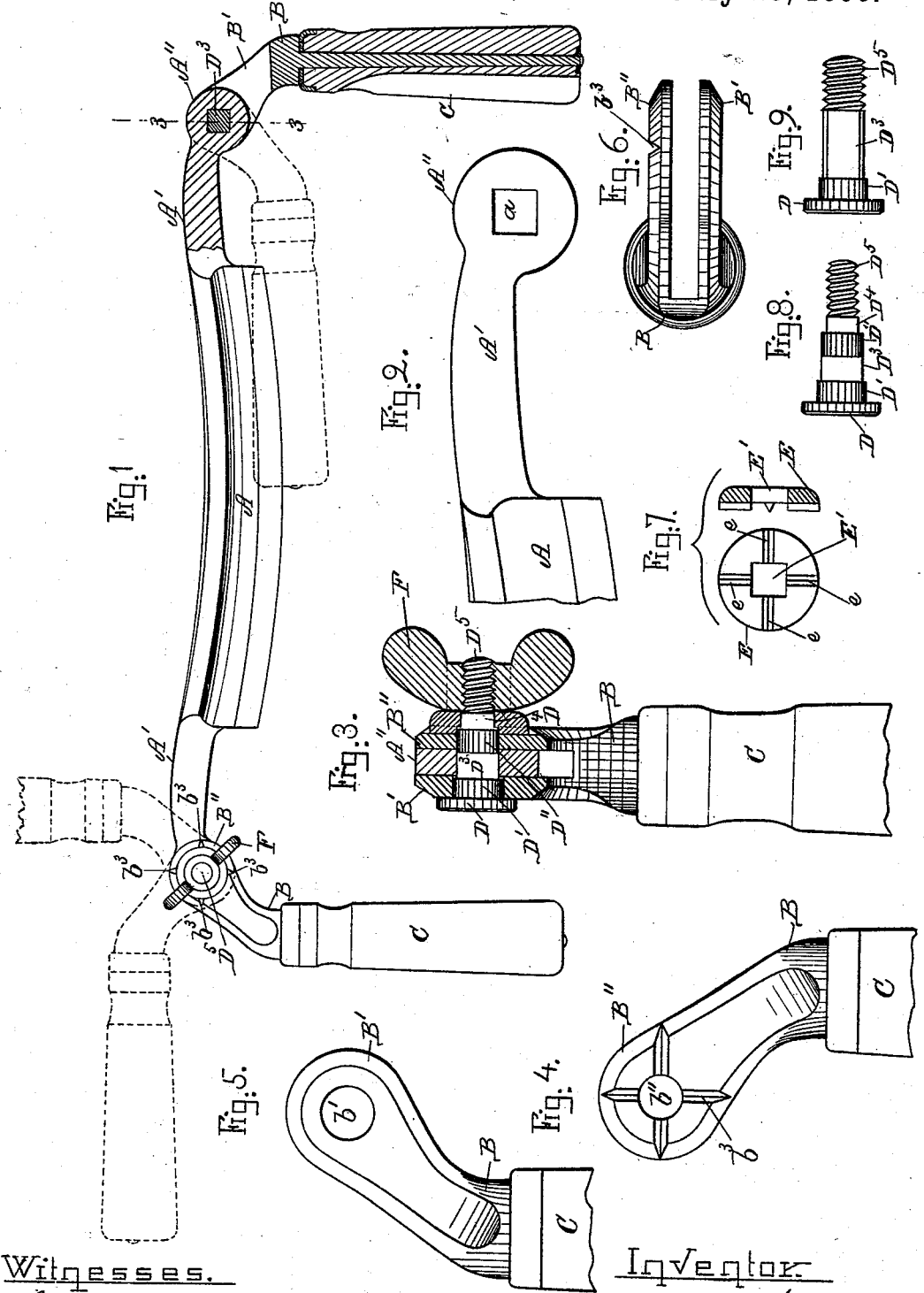
Witnesses.
Lauritz N. Höller
Charles A. Harris
Inventor
Alban Andrén

UNITED STATES PATENT OFFICE.

ALBAN ANDRÉN, OF BEVERLY, MASSACHUSETTS.

DRAWING-KNIFE.

SPECIFICATION forming part of Letters Patent No. 543,144, dated July 23, 1895.

Application filed May 11, 1895. Serial No. 548,895. (No model.)

*To all whom it may concern:*

Be it known that I, ALBAN ANDRÉN, a citizen of the United States, and a resident of Beverly, in the county of Essex and State of Massachusetts, have invented new and useful Improvements in Drawing-Knives, of which the following, taken in connection with the accompanying drawings, is a specification.

This invention relates to improvements in drawing knives or tools with folding handles; and it consists in a simple and effective means for securing the handles in various positions to the ends of the cutting-blade, and it is carried out as follows, reference being had to the accompanying drawings, wherein—

Figure 1 represents a side elevation of the invention, showing one end of the blade and its pivoted handle in section. Fig. 2 represents a full-size detail side elevation of one end of the cutting-blade. Fig. 3 represents a cross-section on the line 3 3 in Fig. 1, shown as enlarged. Fig. 4 represents a front view of the handle-shank. Fig. 5 represents a rear view of said handle-shank. Fig. 6 represents a top view of said handle-shank. Fig. 7 represents a rear view and cross-section of the locking-washer, by means of which the handle-shank is locked to the pivot-bolt. Fig. 8 represents a detail side view of the pivot and locking bolt, and Fig. 9 represents a modified form of such pivot and locking bolt.

Similar letters refer to similar parts wherever they occur on the different parts of the drawings.

In Figs. 1 and 2, A represents the cutter-blade of a drawing-knife or edge-tool having shanks A' A' and circular end hubs A'' A'', as is common in drawing-knives provided with adjustable handles. Each hub A'' has a square or polygonal perforation $a$, as shown in detail in Fig. 2.

B represents the handle-shanks, which are secured in any suitable or well-known manner, respectively, to the handles C C, as usual in devices of this kind.

B' and B'' represent the bifurcated wings of the handle-shank, between which the hub A'' of the cutting-blade or knife A is received, as shown.

The locking device for securing each of the handles in varying positions relative to the cutting-blade is constructed as follows: I make a cylindrical perforation $b'$ through the wing B' of the handle-shank, and I also make a similar cylindrical perforation $b''$ through the wing B'' of said handle-shank, as shown in Figs. 3, 4, and 5. Through the wings B' B'' and the end hub of the blade is inserted a pivotal locking-bolt, which is loosely pivoted in the cylindrical perforations on the wings B' B'' of the handle-shank, said bolt having for this purpose preferably cylindrical portions D' D'' journaled in the respective cylindrical perforations $b'$ and $b''$ in the wings B' B'', as shown in Fig. 3. D is a head on said pivot and locking bolt outside of the wing B', as shown in Fig. 3. Between the cylindrical portions D' D'' is made a square or polygonal portion $D^3$ adapted to fit the square or polygonal perforation $a$ in the end hub A'' of the cutting-blade, as shown in Figs. 3 and 8. In front of the cylindrical portion D'' I make on the said pivot and locking bolt a square or polygonal portion $D^4$, adapted to fit a square or polygonal perforation E' in the washer E, which is provided on its under side with projections $e$, adapted to interlock with notches $b^3$ $b^3$ on the outside of the wing B'', as shown in the drawings. I wish to state, however, that, if so desired, the locking projections may be on the wing B'' and the corresponding notches on the inside of the washer E, or both may be corrugated without departing from the essence of my invention, it being only requisite that there shall be an interlocking device between the washer E and the wing B''. Outside of the square or polygonal portion $D^4$ the said pivot and locking-bolt has a screw-threaded portion $D^5$, adapted to receive an adjustable thumb nut or nuts F, as shown in Figs. 1 and 3.

From the above it will be seen that the wings of the handle-shank are at all times loosely journaled on the pivot and locking bolt; also that said locking-bolt is at all times connected to the hub of the knife-blade.

The wings of the handle-shank are locked to the blade end by the interlocking of the washer E with the wing B'', and said washer is held so interlocked by means of the nut F.

If it is desired to change the position of the handle relative to the blade all that is necessary to do is to loosen the nut F sufficiently to permit the disengagement of the washer E from the wing B'', after which the handle may be swung to any of the positions shown in dotted lines in Fig. 1 and secured in any such desired position simply by the tightening of the nut F, by which the washer E is caused to interlock with the wing B'' of the handle-shank.

It will be noticed that in this my handle-locking device the locking-bolt has no longitudinal movement, but is always held locked to the blade, and its ends are always loosely pivoted in the wings of the handle-shank, and the locking of the handle-shank to the blade is accomplished by the interlocking of an external washer, actuated by a nut, with one of the wings of the handle-shank.

Any number of projections and recesses on the washer and wing of the handle-shank may be used, according to the number of positions in which the handles are desired to be held relative to the blade, as exhibited by dotted lines in Fig. 1.

In practice I may prefer to make the pivotal locking-bolt as shown in Fig. 9, in which the square portion $D^3$ is extended up to the screw-threaded portion $D^5$ and the bolt loosely journaled in the wings of the handle-shank, the same as shown in Fig. 3, it being only essential that the square or polygonal portion of the bolt shall be at all times connected and interlocked with the hub of the knife-blade, and its ends at all times loosely journaled in both wings of the handle-shank.

In changing the position of the handle relative to the knife-blade no adjustment of the pivot and locking bolt is made. It is not longitudinally adjustable, nor is its position changed in any manner relative to the knife-blade.

Having thus fully described the nature, construction, and operation of my invention, I wish to secure by Letters Patent and claim—

The herein described adjustable handle device for edge tools, consisting of a tool blade having a polygonal perforation, combined with a bifurcated handle shank having cylindrical perforations through its wings and a pivot bolt journaled in the wings of the shank and rigidly engaging the edge tool, and a longitudinally adjustable corrugated locking washer interlocking with the pivot-bolt and handle shank, substantially as and for the purpose set forth.

In testimony whereof I have signed my name to this specification, in the presence of two subscribing witnesses, on this 25th day of April, A. D. 1895.

ALBAN ANDRÉN.

Witnesses:
W. B. BESSY,
CHARLES A. HARRIS.